March 13, 1962     D. G. SMITH     3,024,670
SAW SHARPENING APPARATUS FOR SHARPENING CURVED SAW BLADES
Filed Feb. 27, 1961     4 Sheets-Sheet 1
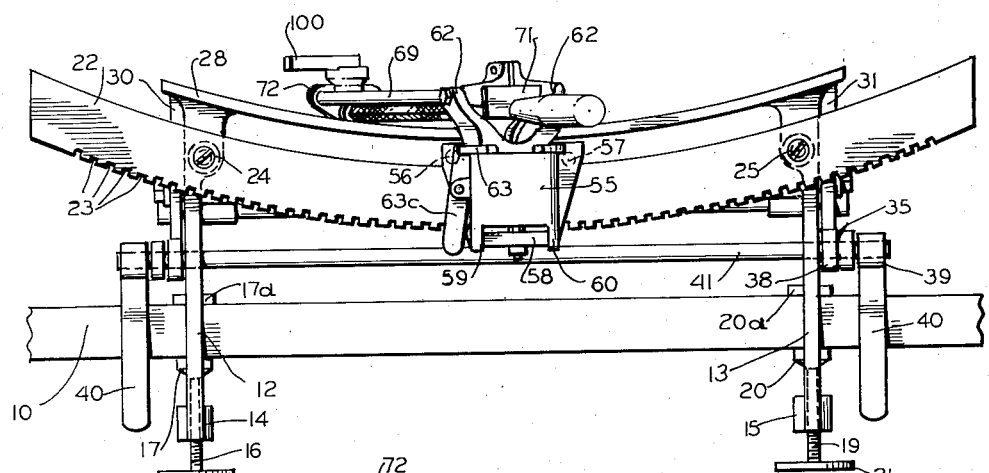
FIG_1
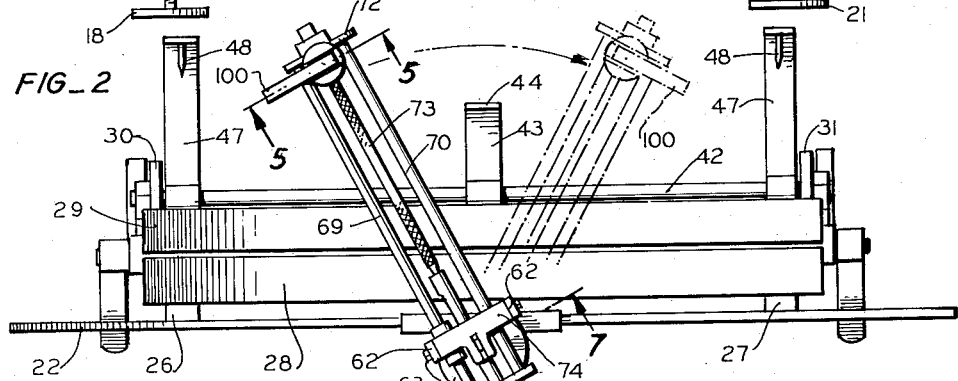
FIG_2
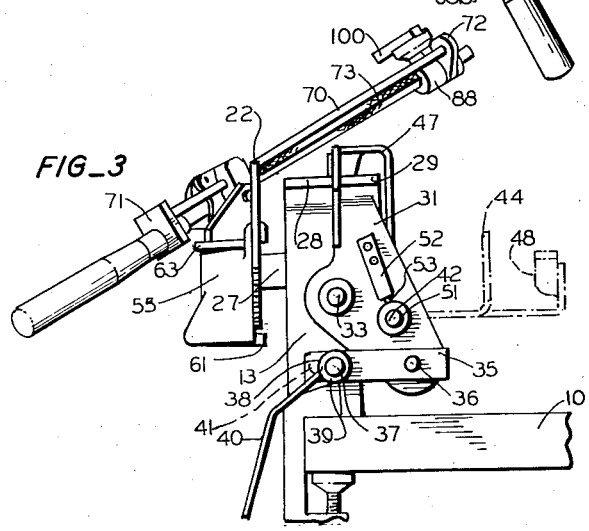
FIG_3
FIG_4
INVENTOR.
DRESDEN G. SMITH
BY
ATTORNEYS March 13, 1962  D. G. SMITH  3,024,670
SAW SHARPENING APPARATUS FOR SHARPENING CURVED SAW BLADES
Filed Feb. 27, 1961  4 Sheets-Sheet 2
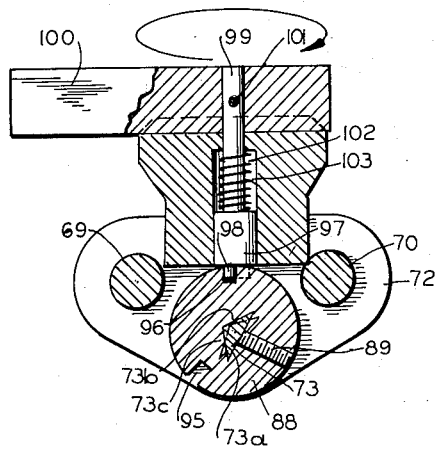
FIG_5
FIG_6
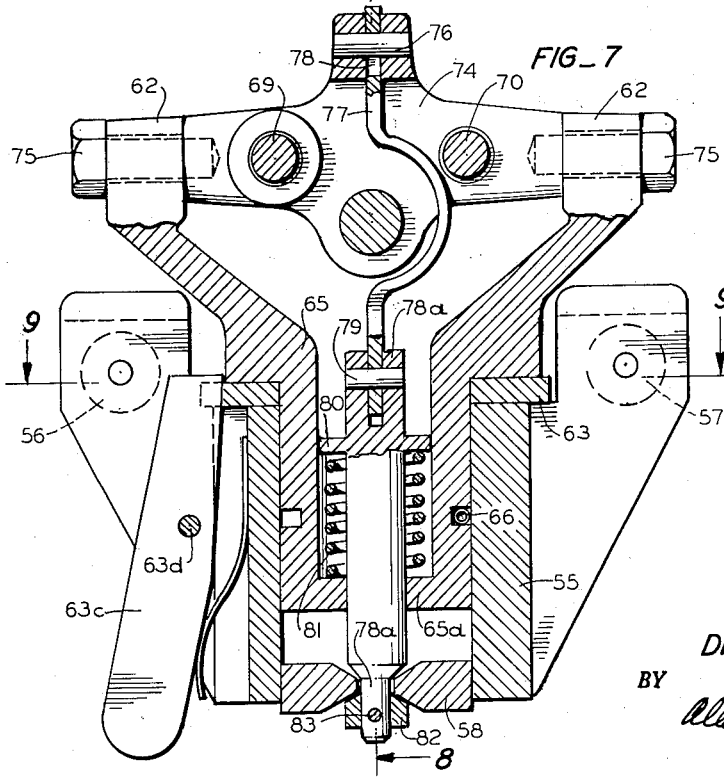
FIG_7
INVENTOR.
DRESDEN G. SMITH
BY
ATTORNEYS March 13, 1962 D. G. SMITH 3,024,670
SAW SHARPENING APPARATUS FOR SHARPENING CURVED SAW BLADES
Filed Feb. 27, 1961 4 Sheets-Sheet 3
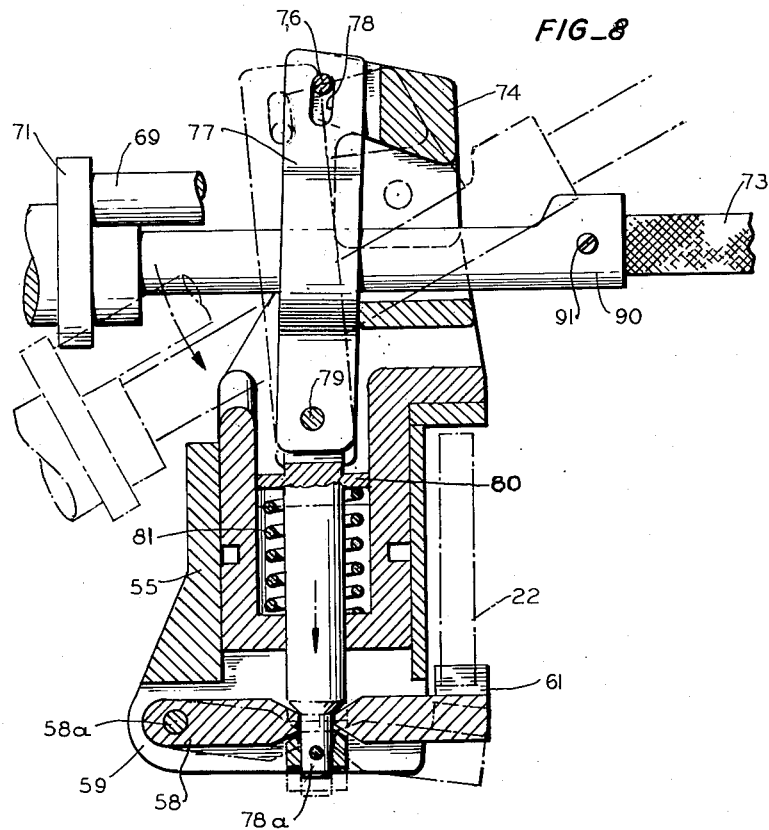
FIG_8
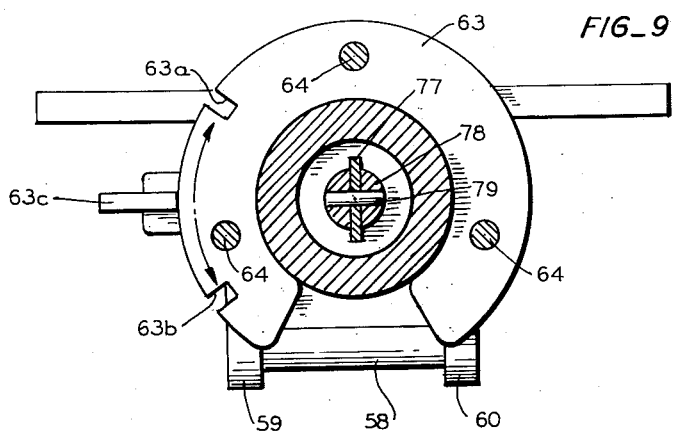
FIG_9
INVENTOR.
DRESDEN G. SMITH
BY
*Allen and Chomey*
ATTORNEYS March 13, 1962 D. G. SMITH 3,024,670
SAW SHARPENING APPARATUS FOR SHARPENING CURVED SAW BLADES
Filed Feb. 27, 1961 4 Sheets-Sheet 4
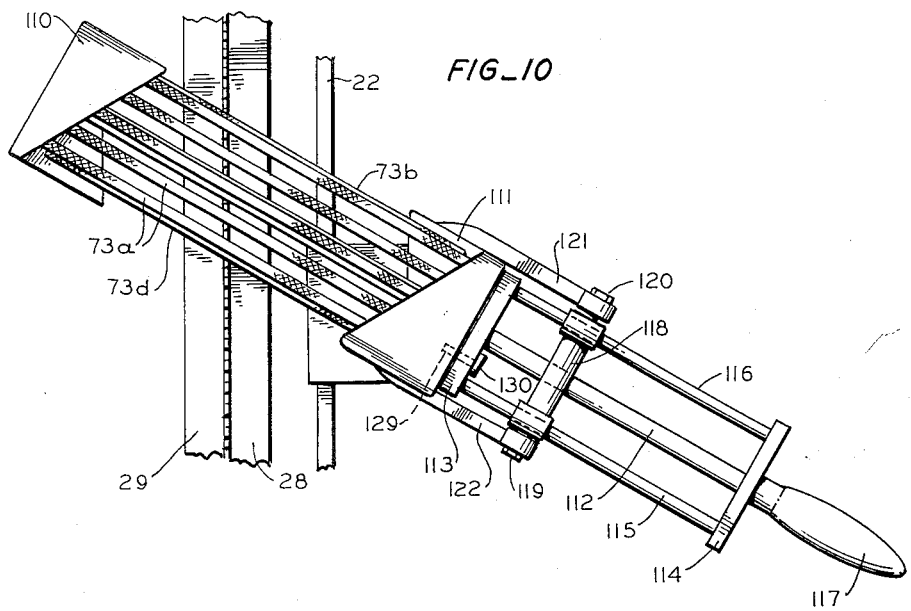
FIG_10
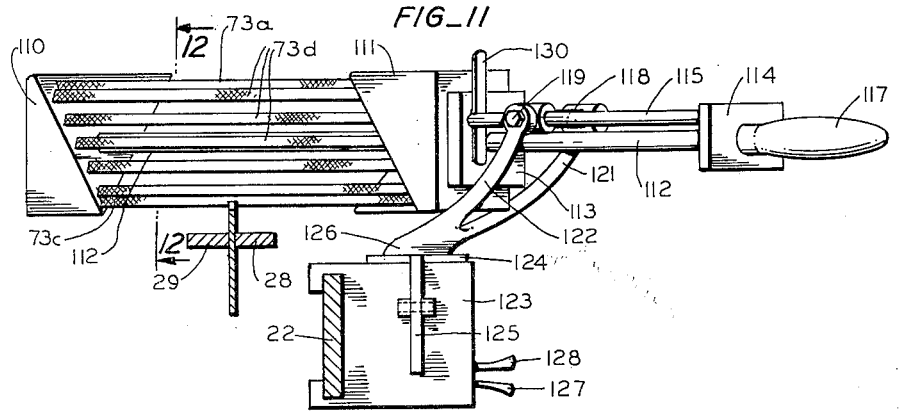
FIG_11
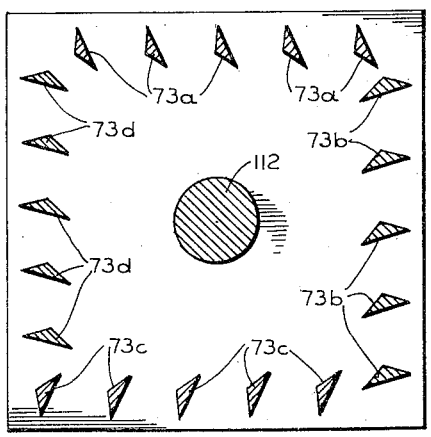
FIG_12
INVENTOR.
DRESDEN G. SMITH
BY
*Allen and Allen*
ATTORNEYS United States Patent Office 3,024,670
Patented Mar. 13, 1962

3,024,670
SAW SHARPENING APPARATUS FOR SHARPENING CURVED SAW BLADES
Dresden G. Smith, 1576 Shady Glen Ave., Santa Clara, Calif.
Filed Feb. 27, 1961, Ser. No. 91,840
13 Claims. (Cl. 76—31)

This invention relates to a saw sharpening apparatus for sharpening curved saw blades.

An object of this invention is to provide an improved saw sharpening apparatus that is adapted to sharpen curved saw blades.

Another object of this invention is to provide an improved saw sharpening apparatus for sharpening curved saw blades, said apparatus having an indexing bar that performs the dual function of guiding the saw sharpener carriage along an arc which matches the saw blade concave arc and indexes the file carriage at set stations along the arc at the proper sawtooth spacing.

Another object of this invention is to provide an improved saw sharpener for sharpening curved saw blades, the sharpener being provided with curved vise jaws for rigidly supporting the saw blade close to the bottoms of the sawteeth to prevent chattering of the file during the filing or sharpening operation.

Another object of this invention is to provide an improved saw sharpening apparatus which is provided with locating feelers or blades and a height pad for the purpose of locating the saw blade in the vise of the sharpener in correct relation to the indexing bar thereof.

Another object of this invention is to provide an improved saw sharpener in which the indexing bar is located forward of the saw blade so that the operator does not have to reach over the sawteeth of the saw in order to index the carriage, thereby also allowing the maximum visibility of the area where the file engages the saw.

Still another object of this invention is to provide an improved saw sharpener which is adapted for sharpening curved saw blades of different radius of curvature and/or tooth spacing simply by changing the indexing bar.

A further object of this invention is to provide an improved saw sharpener in which the front jaw of the saw vise is also one of the principal frame members of the machine.

A further object of this invention is to provide an improved saw sharpener in which the carriage carrying the file is clamped tightly to the indexing bar during the saw filing operation so that it is possible to accurately control the tooth spacing and tooth height on the saw blade that is being sharpened.

Still another object of this invention is to provide an improved saw sharpener in which the file assembly is made up of two guide bars which are spaced comparatively far apart and they are positioned on opposite sides of the file so that the operator can see the file and saw contact area without obstruction and also this assembly rigidly constrains the file so that it cannot move sideways or rotate on its own axis.

Still a further object of this invention is to provide an improved saw sharpener in which the file assembly and the carriage thereof are arranged so that the axis on which the file assembly is pivoted in its yoke is in the same plane as the axes of the guide bars of the file assembly so that it is impossible for the drag of the guide bar bearings to affect the cutting action of the file caused by an unbalanced moment produced by bearing drag.

Still another object of this invention is to provide an improved saw sharpener in which the file assembly is provided with an arrangement whereby the file is supported so that it engages the front of the sawteeth at a particular angle during the filing thereof and when the back of the sawteeth are to be filed, the file is positioned at a slightly greater angle to the saw blade.

Other and further objects of this invention will be apparent to those skilled in the art to which it relates from the following specification, claims and drawing in which, briefly:

FIG. 1 is a view in front elevation of an embodiment of this invention;

FIG. 2 is a plan view of this embodiment of this invention;

FIG. 3 is a side view;

FIG. 4 is a detail view showing the position of the file for filing the front of a tooth and also for filing the back of a sawtooth;

FIG. 5 is a sectional view taken along the line 5—5 of FIG. 2;

FIG. 6 is a detail view showing the manner in which the curved saw blade is clamped in the saw sharpener vise;

FIG. 7 is a sectional view taken along the line 7—7 of FIG. 2; with the yoke rotated parallel to the indexing bar;

FIG. 8 is a sectional view taken along the line 8—8 of FIG. 7;

FIG. 9 is a sectional view taken along the line 9—9 of FIG. 7;

FIG. 10 is a plan view of a multiple file holder employed in accordance with this invention;

FIG. 11 is a side view of the multiple file holder shown in FIG. 10; and

FIG. 12 is a sectional view taken along the line 12—12 of FIG. 11.

Referring to the drawing in detail, there is illustrated a saw sharpener for sharpening curved saw blades such as are used in pruning saws, and this saw sharpener is provided with a frame which includes upright members 12 and 13 that are provided with pads 17a and 20a respectively for engaging the top surface of a work bench 10. Threaded socket members 14 and 15 are attached to the bottom end portions of the frame members 12 and 13 for the purpose of receiving the threaded rods 16 and 19, respectively, of the clamps which are employed for clamping the pads 17 and 20 of this apparatus against the bottom surface of the work bench 10. Pads 17 and 20 are rotatably mounted on the upper ends of the threaded rods 16 and 19, respectively, for the purpose of engaging the under side of the work bench, and handle members 18 and 21 are attached to the bottom ends of the rods 16 and 19, respectively, so that these rods may be manually rotated by gripping these handle members to bring the pads 17 and 20, respectively, up against the bench.

A curved indexing bar 22 which is provided with a plurality of equally spaced indexing notches 23 on the lower portion thereof is attached to the projections, or bosses 26 and 27, extending from the upright members 12 and 13, respectively. Each of these projections is provided with a threaded hole for receiving the machine screws, such as the screws 24 and 25, which hold the indexing bar 22 on the upright members.

The curved saw blade is clamped between the curved vise jaws 28 and 29 during the saw filing operation. The jaw 28 is attached by welding or the like to the upper end portions of the upright members 12 and 13 so that this jaw forms one of the frame members of the frame of this apparatus and is fixedly held on the work bench 10 when this saw filing and sharpening apparatus is clamped thereto by means of the clamps previously described. The jaw 29 is movable toward and away from the jaw 28. The end portions of the jaw 29 are attached by welding or the like to the members 30 and 31, respectively. The members 30 and 31 are pivotally attached to the upright members 12 and 13, respectively, as by means of bolts, such as the bolt 33 shown in FIG. 3. Handles 40, which are positioned one on each side of the apparatus, are provided for the purpose of moving the jaw 29 toward or away from the jaw 28, and these handles are fixedly attached to the ends of the rod 41 which is rotatably supported in suitable holes formed in the upright members 12 and 13. Each of the handles 40 is provided with a collar 39, fixedly attached thereto, and which is also fixedly attached to the rod 41. The bottom portions of the members 30 and 31 are each provided with a pivot member such as the pivot pin 36 shown in FIG. 3. The pivot pin 36 is positioned in a suitable hole formed in the arm 35 which functions as an actuating member for rotating the member 31 through a small angle about its pivot 33. The other end of the arm 35 is rotatably attached to the short shaft 37 between the collar 39 and the member 38. The shaft 37 is fixedly attached to the member 38 which functions as an eccentric and which is fixedly attached to the rod 41. Thus, the shaft 37 and the member 38 are rotatable about the axis of the rod 41, and the shaft 37 is eccentrically disposed with respect to the axis of the rod 41 so that when the handles 40 are extended outward, the shaft 37 is turned to its lowermost position and is disposed below the rod 41, but offset from the end portion thereof. Thus, the member 31 is tilted on its pivot 33, and the jaw 29 is moved away from the jaw 28 as far as it is permitted to move.

When the saw blade is clamped between the jaws 28 and 29, the member 31 is in the position shown in FIG. 3, and the corresponding member 30 on the other end of the apparatus is in a similar position. With the member 31 in this position, the arm 35 is substantially horizontally disposed, and the axis of the short shaft 37 is slightly above the axis of the rod 41; that is, it is past dead center, so that the upper right hand corner of the member 38 is abutted against a surface of the member 31, and the members 30 and 31 are locked in position so that applying pressure to the saw blade and to the jaw 29 cannot unlock the grip of the jaws on the saw blade.

Before the saw blade is clamped by the jaws 28 and 29 it must be properly positioned therebetween so that the teeth thereof extend the proper distance above the jaws of the vise. This distance is determined by means of the pad 44 and the feelers or blades 48. The pad 44, which is positioned in the mid portion of the apparatus, and the pair of feelers or blades 48, one at each end of the apparatus, are supported on the rod 42 which is journalled in the members 30 and 31. Thus, the pad 44 is supported by the member 43 on the rod 42 and the blades 48 are supported on the members 47 which are also attached to the rod 42, and these may be swung out of the way as shown in broken outline in FIG. 3, or they may be elevated to their raised position for use while the saw blade is being adjusted between the jaws of the vise prior to clamping thereof. Thus by using the pad 44 and one of the blades 48 the saw blade is positioned in the vise with the teeth of the saw extending above the vise a proper predetermined distance as shown in FIG. 6. The blades 48 are also used to determine the proper lateral location of the saw so that the saw teeth are positioned correctly with reference to the indexing bar.

A spring-urged locking mechanism is provided for holding the pad 44 and blades 48 in upright position, and this mechanism includes a socket member 52 which is attached to the member 31 by means of suitable machine screws. A plunger 53 and a suitable spring (not shown) are positioned in this socket member so that the spring urges the plunger 53 outward to engage a suitable notch in the collar 51 which is attached to the rod 42. This notch is located in the proper position so that the plunger 53 is pressed into it by means of said spring when the pad 44 and blades 48 are in their elevated positions ready for use in positioning of the saw blade in the vise.

The file supporting carriage is provided with a housing 55 which is adapted to be slidably supported by the indexing bar 22. Rollers 56 and 57 are attached to the housing 55 by means of suitable pins or shafts, and these rollers are adapted to engage the upper surface of the indexing bar 22 to support the carriage on the bar and to facilitate moving it along said bar. The member 58 is pivotally supported by the pin 58a between the bottom members 59 and 60 which are integral with the body member 55 as shown in FIGS. 1 and 8, and the dog 61 which is adapted to engage the indexing bar 22 in any selected indexing notch 23 thereof, is formed integral with the member 58. The sides of the dog 61 are preferably tapered so that it enters the selected notch more readily.

The file carriage is also provided with a yoke member having upright members 62 which are spread apart and receive the member 74 therebetween. The bottom of the yoke member is provided with a shaft 65 which is adapted to fit into the bore of the housing 55, and is held therein by means of the spring-urged pin 66 so that the yoke is rotatable in the housing 55. The yoke may be locked to prevent rotation thereof on the axis of the shaft 65, by means of the disc 63 which is provided with notches 63a and 63b, as shown in FIG. 9, for receiving the latch lever 63c. The disc 63 is attached to the yoke by means of the machine screws 64 and partially encircles the shaft 65 of the yoke. The purpose of the notches 63a and 63b in the disc 63 is to provide a means for locking the file assembly, which is supported by the yoke members 62, either in the position shown in solid lines or in the position shown in broken lines in FIG. 2. Thus, when the spring-urged locking member 63c, shown in FIG. 7, which is pivotally attached to the member 55 by means of the pivot pin 63d, engages the notch 63a of the disc 63, the file assembly is locked in the position shown in solid lines in FIG. 2. However, when the file assembly is to be used in the other position shown in broken lines in FIG. 2, then the yoke is rotated so that the notch 63b is in position to be engaged by the latching lever 63c to lock the file assembly in this position. The purposes of these two file assembly positions will be described further hereinafter.

The file assembly is provided with parallel rods 69 and 70, the respective ends of which are fixedly attached to the end plates 71 and 72, and the file 73 is carried therebetween. The rods 69 and 70 are slidably supported in suitable bearing sleeves which may be of nylon, and which are positioned in holes provided in the member 74. This member is pivotally supported on the yoke members 62 by means of the machine screws or bolts 75 which are threaded into the ends of the member 74. Thus the file assembly may be tilted with respect to the yoke, as shown in FIG. 3 and FIG. 8.

When the file assembly is tilted as described above, the dog 61 is disengaged from the notched index bar 22. This result is accomplished by means of a mechanical connection between the member 74 and the member 58 which mechanical connection includes a lever 77 that is connected to the upper part of the member 74 by the pin 76 which engages the lever 77 in the slot 78. The lower end of this lever is attached to the upper end of the plunger 78a by the pin 79. Thus, the upper end of the lever 77 is pivotally attached to the upper end of the member 74 and the lower end of this lever is pivotally attached to the upper end of the plunger so that, when the file assembly is tilted beyond a predetermined angle at which the pin 76 engages the bottom end of the slot 78, the lever 77 pushes the plunger 78a downward against the spring 81 which surrounds the plunger 78a between the bottom of the shoulder 80 and the shoulder 65a positioned at the lower end of the shaft 65. The plunger 78a extends out of the bottom of the shaft 65 and is provided with an end portion at the lower end thereof of reduced diameter which fits into a hole formed in the member 58. The lower end of the plunger 78a is provided with a collar 82 which is held thereon by means of the pin 83 so that the plunger and member 58 are held thereby in assembled relation.

The file 73 is supported in the file assembly by the members 88 and 90, shown in FIGS. 5 and 8, and the end portions of the file are held in these members by set screws 89 and 91, respectively. The member 88 is rotatably supported in a suitable hole formed in the end member 72 of the file assembly. This member is provided with notches 95 and 96 which are adapted to cooperate with the plunger 97 which is provided with an off-set projection 98 that is adapted to engage the member 88 in either one of the notches 95 or 96 to lock this member and hold the file 73 at a predetermined angular position in the file assembly. The plunger 97 is positioned in a recess 103, together with a coil spring 102, which is positioned around the mid portions of this plunger. A handle 100 is attached to the upper portion 99 of the plunger by means of a pin 101 so that, by gripping the handle 100, the plunger may be pulled further up into the recess 103 against the pressure of the spring 102, and the offset locking pin 98 may be withdrawn from the recess in the member 88, thus permitting this member to be rotated to permit the angular adjustment of the file. Thus the file 73 may be rotated on its axis when the plunger 98 is withdrawn out of engagement with the recesses 95 and 96. Also the file 73 may be tilted slightly through an angle of approximately 10 degrees as shown in FIG. 4 simply by changing the position of the handle 100 from its left-hand position to its right-hand position as shown in FIG. 5. In one position the face 73e of the file is used to sharpen the back edge of a tooth and in the other position the face 73f is used to sharpen the front edge of a tooth.

The operation of this apparatus is as follows: The saw blade is placed between the jaws 28 and 29 of the vise with the handle end of the saw blade at the right-hand end of the vise jaws as shown in FIG. 6. The locating blade 48 and the pad 44 are brought to their upright position and the saw blade is positioned so that the locating blade engages the front edge of a saw tooth set toward the operator; that is, a tooth set in the left-hand direction looking down the saw from the handle end. The saw blade should also engage the bottom surface of the pad. The saw blade is then clamped between the jaws by moving either one of the handles 40 down and the pad 44 and blade 48 are tilted down. The file assembly is then moved to the right-hand end of the apparatus, care being taken to tilt the file assembly as shown in FIG. 3 so that the dog 61 is disengaged from the indexing bar 22.

The handle 100 at the far end of the file assembly is placed in its left direction as shown in FIG. 2 and the file 73 is tilted with its large face 73e on the right as shown in FIG. 5 and with the plunger 98 lodged in recess 96. Also, the file assembly is latched in the notch 63b, giving the file assembly the direction shown in broken lines in FIG. 2. The apparatus is now set to file the front edges of the teeth set to the right. All of the front edges of the teeth set to the right are filed one after the other starting at the handle end of the saw blade positioned at the right-hand end of the apparatus and proceeding towards the left. Thereafter, the file assembly is shifted to point in the direction shown in FIG. 2 in solid lines by releasing the latch 63c from notch 63b and turning the file assembly so that this latch engages notch 63a. The angle of the file is now also adjusted by lifting on the handle 100 at the far end of the file assembly, and turning this handle 100 to point in the right-hand direction as shown in broken lines in FIG. 2. File 73 is now set so that the large face 73e thereof is at the proper angle to file the back edges of the teeth set to the right. The back edges of the teeth set to the right are now filed one after another, proceeding from the left end of the saw blade to the right.

The saw blade is now removed and it is placed into the vise jaws with its handle end projecting from the left-hand side of the vise jaws. The file assembly is positioned so that it assumes the angle shown in solid lines in FIG. 2 and the handle 100 at the far end of the file assembly is set so that it points in the right-hand direction. The file is also angled so that the large face 73e thereof is on the left by lifting the plunger 98 out of the recess 96, rotating the file through part of a turn until the plunger 98 is received by recess 95 to lock it in this position. The file assembly is now positioned to file the front edges of the teeth set to the left of the saw blade proceeding from the left end of the apparatus to the right. Thereafter, the back edges of these teeth are filed, and for this the file angle is shifted slightly by lifting up on the handle 100 and turning it so that it points in the left-hand direction. This provides a slight angular adjustment of the file by the cam action of the portion 98 of the plunger. Also the angle of the file assembly was adjusted to the angle shown in broken lines in FIG. 2 by releasing the latch 63c from the notch 63a, turning the file assembly through part of a turn so that the latch 63c engages the notch 63b. With the file assembly thus set the operator proceeds to the left, filing the back edges of the teeth set to the left one after the other to complete the filing of the saw blade.

In FIGS. 10, 11 and 12 there is illustrated a multiple file carriage in which four groups of five files each may be provided to this apparatus whereby five files are used simultaneously in the saw sharpening operation. Thus four groups of files 73a, 73b, 73c and 73d are provided to the carriage and these file groups form part of the carriage framework in that they extend between the end blocks 110 and 111 and they are anchored by set screws in suitable holes formed in these blocks. A central member 112 extends between the blocks 110 and 111 to which it is attached by suitable set screws, and it also extends between the carriage members 113 and 114 projecting beyond the member 114 into the handle 117. A pair of rods 115 and 116 is provided between the members 113 and 114, positioned one on each side of the member 112 and these rods are slidably supported in suitable nylon bushings provided in the member 118 which is pivotally supported by means of suitable bolts 119 and 120 on the upper end portions of the members 121 and 122, respectively so that the files may be tilted with respect to the saw blade held between the jaws 28 and 29. The lower ends of the members 121 and 122 are joined together at 126 and provided with a shaft that extends into the block and is rotatable with respect thereto. A latching disc 124 is attached to the member 126 and cooperates with the latch lever 125 which engages suitable notches in the disc 124 and holds the carriage and files positioned at the desired angle with respect to the saw blade that is clamped between the jaws 28 and 29. The latch lever 125 is pivotally attached to the block 123 in the same manner as the latch lever 63c is pivotally attached to the member 55. A dog similar to the dog 61 is provided to the block 123 and this dog is adapted to be released from the indexing bar 22 by the lever 127 which is attached to the dog and is pivotally supported by the block 123. Thus the operator desiring to release the dog simply presses the lever 127 toward the fixed lever 128.

The blocks 110 and 111 are shaped so that the files in each of the file groups 73a, 73b, 73c and 73d are held therein in offset fashion and the files in the different groups are positioned at different angles as shown in FIG. 12. Thus the files in each group are positioned at the correct angle for filing the saw teeth, as previously described. The member 112 may be rotated by releasing the latch pin 129 from a suitable hole formed in the block 111 so that the handle 117 and the member 112 may be rotated to bring another group of files into filing position. In this position another hole is provided to the block 111 for receiving the pin 129 for locking the block 111 and files against rotation. The pin 129 is attached to the leaf spring member 130 which is attached to the member 113 through which the pin 129 extends, and the pin 129 may be withdrawn from the block 111 simply by pulling on the top of leafspring member 130.

The files in groups 73a, 73b, 73c and 73d may be spaced by distances equal to the spacing between one or more saw teeth as desired. Also, the files in each of these groups may be rotated by removing the files in group 73a, for example, and placing them into the positions occupied by the files 73b, for example, and so on so that all of the filing surfaces of the different files are fully utilized.

While I have shown a preferred embodiment of the invention, it will be understood that this invention is capable of variation and modification from the form shown, so that its scope should be limited only by the scope of the claims appended hereto.

What I claim is:

1. In a saw sharpener for sharpening curved saw blades such as are used in pruning saws and the like the combination of a frame having a pair of upright members, means for clamping said upright members to a bench, a vise having concave jaws for receiving and clamping the curved saw blade therebetween, one of said jaws being attached to the upper ends of said upright members, an indexing bar having a curvature substantially like that of said saw blade, means for attaching said indexing bar to said upright members below and in front of said one of said jaws, a file supporting carriage slidably mounted on said indexing bar, said carriage comprising a yoke having a shaft, a socket for receiving said shaft and for rotatably supporting said yoke, a bearing block pivotally supported by said yoke, a pair of guide rods slidably mounted in said bearing block so that said guide rods are adapted to be reciprocated back and forth over the top of the saw clamped in said vise, said guide rods having means for supporting a file thereon, the longitudinal axis of each of said guide rods intersecting the axis of the pivotal support of said bearing block.

2. In a saw sharpener for sharpening curved saw blades such as are used in pruning saws and the like the combination of a frame having a pair of upright members, means for clamping said upright members to a bench, a vise having concave jaws for receiving and clamping the curved saw blade therebetween, one of said jaws being attached to the upper ends of said upright members, an indexing bar having a curvature substantially like that of said saw blade, means for attaching said indexing bar to said upright members below and in front of said one of said jaws, a file supporting carriage slidably mounted on said indexing bar, said carriage comprising a yoke having a shaft, a socket for receiving said shaft and for rotatably supporting said yoke, a bearing block pivotally supported by said yoke, a pair of guide rods slidably mounted in said bearing block so that said guide rods are adapted to be reciprocated back and forth over the top of the saw clamped in said vise, means for supporting a file on said guide rods comprising end members attached to said guide rods and means attached to the ends of said file journaled in said end members and a latch attached to one of said end members for holding said file in any one of a plurality of predetermined angular positions, different ones of said angular positions being predetermined for filing the front and back edges of left and right set teeth of the saw blade.

3. In a saw sharpener for sharpening curved saw blades such as are used in pruning saws and the like the combination of a frame having a pair of upright members, means for clamping said upright members to a bench, a vise having concave jaws for receiving and clamping the curved saw blade therebetween, one of said jaws being attached to the upper ends of said upright members, an indexing bar having a curvature substantially like that of said saw blade, means for attaching said indexing bar to said upright members below and in front of said one of said jaws, a file supporting carriage slidably mounted on said indexing bar, said carriage comprising a yoke having a shaft, a socket for receiving said shaft and for rotatably supporting said yoke, a bearing block pivotally supported by said yoke, a pair of guide rods slidably mounted in said bearing block so that said guide rods are adapted to be reciprocated back and forth across the top of the saw clamped in said vise, said guide rods having means for supporting a file thereon, an indexing member attached to said yoke and a latch pivotally attached to said socket for latching said indexing member in one of two predetermined angular positions with respect to the saw blade clamped in said jaws so that said file is adapted to be held at one of said predetermined angular positions during the filing of the front edges of the saw teeth and in the other of said predetermined angular positions during the filing of the back edges of the saw teeth.

4. In a saw sharpener for sharpening curved saw blades such as are used in pruning saws and the like the combination of a frame having a pair of upright members, means for clamping said upright members to a bench, a vise having concave jaws for receiving and clamping the curved saw blade therebetween, one of said jaws being attached to the upper ends of said upright members, an indexing bar having a curvature substantially like that of said saw blade, means for attaching said indexing bar to said upright members below and in front of said one of said jaws, a file supporting carriage slidably mounted on said indexing bar, said carriage comprising a yoke having a shaft, a socket for receiving said shaft and for rotatably supporting said bearing member, a bearing block pivotally supported by said yoke, a pair of guide rods slidably mounted in said bearing block so that said guide rods are adapted to be reciprocated back and forth across the top of the saw clamped in said vise, said guide rods having means for supporting a file thereon, a dog pivotally supported on said carriage adjacent to said indexing bar, said indexing bar having notches thereon for receiving said dog to hold said carriage immobilized on said indexing bar during the filing of selected teeth of said saw, and means connected between said bearing block and said dog for releasing said dog from said indexing bar after said guide rods are tilted to a predetermined extent so that said carriage may be moved on said indexing bar.

5. In a saw sharpener for sharpening curved saw blades such as are used in pruning saws and the like the combination of a frame having a pair of upright members, means for clamping said upright members to a bench, a vise having concave jaws for receiving and clamping the curved saw blade therebetween, one of said jaws being attached to the upper ends of said upright members, an indexing bar having a curvature substantially like that of said saw blade, means for attaching said indexing bar to said upright members below and in front of said one of said jaws, a file supporting carriage slidably mounted on said indexing bar, said carriage comprising a yoke having a shaft, a socket for receiving said shaft and for rotatably supporting said bearing member, a bearing block pivotally supported by said yoke, a pair of guide rods slidably mounted in said bearing block so that said guide rods are adapted to be reciprocated back and forth across the top of the saw clamped in said vise, end members attached to the ends of said guide rods, means for supporting a file on said end members between said guide rods, said last mentioned means including a rotatable member having a pair of spaced recesses and means for engaging said recesses selectively for holding said file positioned so that different faces thereof may be used selectively in filing a saw blade.

6. In a saw sharpener for sharpening curved saw blades such as are used in pruning saws and the like the combination of a frame having a pair of upright members, means for clamping said upright members to a bench, a vise having concave jaws for receiving and clamping the curved saw blade therebetween, one of said jaws being atached to the upper ends of said upright members, the other of said jaws being movable with respect to said one jaw, a pair of members attached to said other of said jaws, one of said pair of members being pivotally attached to one of said upright members and the other of said pair of members being pivotally attached to the other of said upright members, an indexing bar having a curvature substantially like that of said saw blade, means for attaching said indexing bar to said upright members below and in front of said one of said jaws, a file supporting carriage slideway mounted on said indexing bar, said carriage comprising a yoke having a shaft, a socket for receiving said shaft and for rotatably supporting said bearing member, a bearing block pivotally supported by said yoke, a pair of guide rods slidably mounted in said bearing block so that said guide rods are adapted to be reciprocated back and forth across the top of the saw clamped in said vise, said guide rods having means for supporting a file thereon.

7. In a saw sharpener for sharpening curved saw blades such as are used in pruning saws and the like the combination of a frame having a pair of upright members, means for clamping said upright members to a bench, a vise having concave jaws for receiving and clamping the curved saw blade therebetween, one of said jaws being attached to the upper ends of said upright members, an indexing bar having a curvature substantially like that of said saw blade, means for attaching said indexing bar to said upright members below and in front of said one of said jaws, a file supporting carriage slidably mounted on said indexing bar, said carriage having a plurality of files mounted thereon in a four sided array, said carriage comprising a yoke having a shaft, a socket for receiving said shaft and for rotatably supporting said yoke, bearing block means pivotally supported by said yoke, a pair of guide rods slidably mounted in said bearing means so that said guide rods are adapted to be reciprocated back and forth and a plurality of said files on one side of said array is used to simultaneously file a plurality of the teeth of the saw clamped in said vise, the longitudinal axis of each of said guide rods intersecting the axis of the pivotal support of said bearing block.

8. In a saw sharpener for sharpening curved saw blades such as are used in pruning saws and the like the combination of a frame having a pair of upright members, means for clamping said upright members to a bench, a vise having concave jaws for receiving and clamping the curved saw blade therebetween, one of said jaws being attached to the upper ends of said upright members, an indexing bar having a curvature substantially like that of said saw blade, means for attaching said indexing bar to said upright members below and in front of said one of said jaws, a file supporting carriage slidably mounted on said indexing bar, said carriage comprising a pair of end blocks each having means around the sides thereof for receiving the end portions of files mounted thereon so that said files are arranged in a multi-sided array, a yoke having a shaft, a socket for receiving said shaft and for rotatably supporting said yoke, bearing block means pivotally supported by said yoke, a pair of guide rods slidably mounted in said bearing means so that a plurality of said files on a selected side of said array is adapted to be reciprocated back and forth over the top of the saw clamped in said vise to sharpen a plurality of teeth thereof simultaneously.

9. In a saw sharpener for sharpening curved saw blades such as are used in pruning saws and the like the combination of a frame having a pair of upright members, means for clamping said upright members to a bench, a vise having concave jaws for receiving and clamping the curved saw blade therebetween, one of said jaws being attached to the upper ends of said upright members, an indexing bar having a curvature substantially like that of said saw blade, means for attaching said indexing bar to said upright members below and in front of said one of said jaws, a file supporting carriage slidably mounted on said indexing bar, said carriage comprising a pair of end blocks each having means around the sides thereof for receiving the end portions of files mounted thereon so that said files are arranged in a multi-sided array, a yoke having a shaft, a socket for receiving said shaft and for rotatably supporting said yoke, bearing means pivotally supported by said yoke, a pair of guide rods slidably mounted in said bearing means so that a plurality of said files on a selected side of said array is adapted to be reciprocated back and forth over the top of the saw clamped in said vise, means for rotating said array of files with respect to said carriage so that different groups of said files may be selected for use in filing said saw, and means for locking said last mentioned means in selected positions.

10. In a saw sharpener for sharpening curved saw blades as set forth in claim 4 further characterized in that the spacing of the notches in said indexing bar matches the spacing of the saw teeth of the saw being sharpened.

11. In a saw sharpener for sharpening curved saw blades as set forth in claim 4 further comprising a handle attached to said guide rods, said means connected between said bearing block and said dog being adapted to release said dog from said indexing bar when said guide rods are tilted to a predetermined extent without the operator's grip being shifted from said handle.

12. In a saw sharpener for sharpening curved saw blades as set forth in claim 4 further comprising means for engaging the teeth of said saw to locate said saw teeth at a predetermined height with respect to said jaws and to position the saw teeth in predetermined relation with respect to the notches in said indexing bar.

13. In a saw sharpener for sharpening curved saw blades as set forth in claim 12 further characterized in that said last mentioned means comprises a pad located substantially at the mid portion of said jaws and a pair of blades located at the end portions of said jaws, said blades being adapted to engage the saw blade between adjacent teeth thereof so as to position the saw teeth of the saw in predetermined relation with respect to the notches in said indexing bar.

No references cited.